United States Patent

Porcher et al.

(10) Patent No.: US 7,164,276 B2
(45) Date of Patent: Jan. 16, 2007

(54) METHOD FOR DETERMINING THE WALL THICKNESS OF A METAL TUBE

(76) Inventors: Klaus Porcher, Burgdorfer Strabe 9, D-31275 Lehrte (DE); Christian Frohne, Christian-Flemes-Weg 11, D-30657 Hannover (DE)

( * ) Notice: Subject to any disclaimer, the term of this patent is extended or adjusted under 35 U.S.C. 154(b) by 0 days.

(21) Appl. No.: 11/259,364

(22) Filed: Oct. 26, 2005

(65) Prior Publication Data

US 2006/0091895 A1 May 4, 2006

(30) Foreign Application Priority Data

Nov. 3, 2004 (DE) .................. 10 2004 053 021

(51) Int. Cl.
*G01R 27/08* (2006.01)
*B21C 51/00* (2006.01)

(52) U.S. Cl. .................. 324/699; 72/31.01; 72/31.06

(58) Field of Classification Search ................ 324/699, 324/609; 72/31.01, 31.06
See application file for complete search history.

(56) References Cited

U.S. PATENT DOCUMENTS

| | | | | |
|---|---|---|---|---|
| 2,213,983 A | * | 9/1940 | Gooding | ............... 72/18.8 |
| 4,048,558 A | * | 9/1977 | Goodman | ............... 324/609 |
| 4,837,518 A | * | 6/1989 | Gard et al. | ............... 324/368 |
| 4,947,132 A | * | 8/1990 | Charoy et al. | ............... 324/699 |
| 2005/0200369 A1 | * | 9/2005 | Langevin | ............... 324/691 |

FOREIGN PATENT DOCUMENTS

| | | |
|---|---|---|
| DE | 1960490 | 2/2000 |
| EP | 1031826 | 12/1964 |

OTHER PUBLICATIONS

German Search Report—Nov. 12, 2004.

* cited by examiner

*Primary Examiner*—Andrew H. Hirshfeld
*Assistant Examiner*—John Zhu
(74) *Attorney, Agent, or Firm*—Sofer & Haroun, LLP

(57) ABSTRACT

A method for determining the wall thickness of a metal tube is described. This method has the following features: (a) preparation of a metal tube of a determined length; (b) arrangement of two clamp contacts on the metal tube with an exactly defined distance of separation; (c) connection of the ends of the metal tube with a power source; and (d) measurement of the voltage drop in the metal tube between the clamp contacts.

4 Claims, 2 Drawing Sheets

METHOD FOR DETERMINING THE WALL THICKNESS OF A METAL TUBE

RELATED APPLICATIONS

This application is related to and claims the benefit of priority from German Patent Application No. 10 2004 053 021.1, filed on Nov. 3, 2004, the entirety of which is incorporated herein by reference.

FIELD OF THE INVENTION

The invention concerns a method for determining the wall thickness of a metal tube.

BACKGROUND

DE 35 42 681 A1 describes a method for producing high-quality drawn tubes, in which a metal strip is shaped into a tube with a longitudinal slit, and the longitudinal slit is welded. In a final operation, the welded metal tube is reduced in its outside diameter and its wall thickness with a drawing ring and a floating mandrel in a continuously operating tube-drawing machine.

When the tube-drawing machine is being set up, especially with respect to the selection of the drawing tools (mandrel, die), the wall thickness of the reduced metal tube must be measured before production can begin. In many cases, this can significantly delay the beginning of production.

In the continuous production of metal tubes with an outside diameter of less than 5 mm and a wall thickness of less than 0.1 mm, the wall thickness has been measured by optical means up until now. In this measuring operation, a short piece of the finished tube is embedded in casting resin, and after the casting resin has cured, a microsection of the surface is prepared, which can then be viewed under a microscope. A photograph of the transverse microsection is taken, and the tube is measured.

A high-precision microscope with a camera adapter and suitable measuring software are necessary for the extremely thin metal tubes under discussion here. This apparatus is very expensive, and the operation is very time-consuming, i.e., it can take several hours. During this period of time, production cannot be started.

OBJECTS AND SUMMARY

The objective of the present invention is to specify a method for determining the wall thickness of longitudinally welded metal tubes in which the measurement result is available in a much shorter time, and the measurement can be performed in the production facility. The measurement result should be reproducible with a maximum deviation of 1%.

The chief advantage of the invention is that, especially with the use of a reference tube whose outside diameter is the same as the outside diameter of the tube to be produced but whose wall thickness is greater than the wall thickness of the tube to be produced, the accuracy of the measuring method can be increased, since both tubes have the same temperature and the same specific resistance. The resistance of the metal tubes (finished tube with the smaller wall thickness and reference tube with the larger wall thickness) is inversely proportional to the wall thickness. Since the outside diameter of the finished tube and the reference tube is the same, the wall thickness can be determined very quickly and, if necessary, can be corrected by replacing or reworking the mandrel.

BRIEF DESCRIPTION OF THE DRAWINGS

The invention is explained in greater detail below with reference to the specific embodiments schematically illustrated in FIGS. 1 and 2.

DETAILED DESCRIPTION

Figure 1:
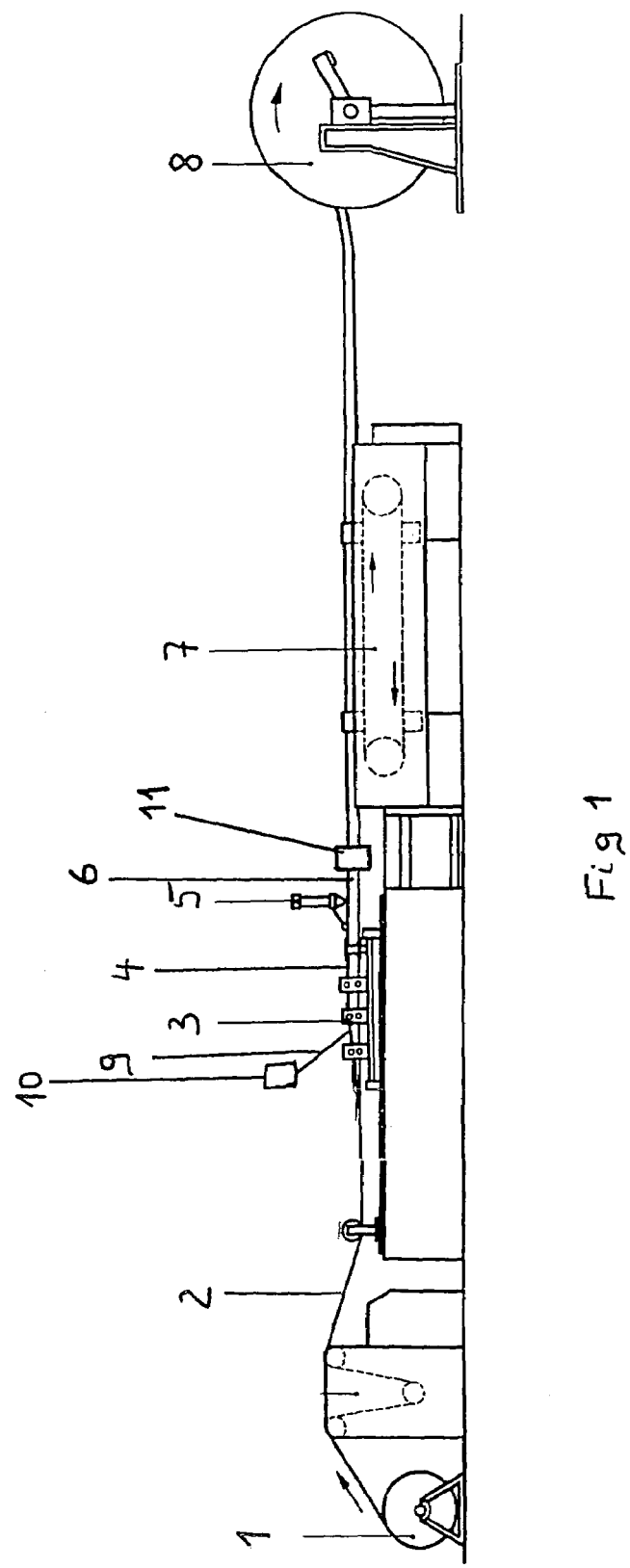
FIG. 1 shows a side view of a machine of the type described, for example, in DE 101 51 827 A1 for the continuous production of longitudinally welded metal tubes.

FIG. 1 shows a side view of a machine of the type described, for example, in DE 101 51 827 A1 for the continuous production of longitudinally welded metal tubes.

A metal strip 2, which consists, for example, of austenitic steel, is drawn from a supply reel 1 and fed to a set of shaping rollers 3, in which the metal strip 2 is gradually shaped into a tube 4 with a longitudinal slit. The longitudinal slit is sealed with a welding device 5, preferably a laser welding device. After the welding device 5, the welded tube 6 is grasped by a collet feed, 7, which conveys the metal strip 2, the slit tube 4 and the welded tube 6 through the production unit. The collet feed is described in German Auslegeschrift (Late Disclosure) 11 64 355.

The welded tube 6 is then wound onto a cable drum 8.

The method described above is limited to tubes with an outside diameter of at least 2 mm.

There is a need for metal tubes with an outside diameter of less than 2 mm and a wall thickness of less than 0.1 mm. Metal tubes of this description are used in the production of hypodermic needles.

To be able to produce metal tubes with these dimensions, the longitudinally welded tubes produced by the method described above must be reduced to the desired dimensions by drawing in one or more steps.

To make the longitudinally welded tubes suitable for the subsequent drawing operations, it is necessary to provide the inner surface of the metal tube 6 with a lubricant film.

For this purpose, lubricant from a reservoir 10 is introduced by a lance 9 into the slit tube 4 or the welded tube 6.

The outside diameter of the welded metal tube 6 can be reduced by a drawing die 11. If a mandrel (not shown) is positioned in the welded metal tube 6, for example, a so-called floating mandrel, the wall thickness of the welded metal tube 6 can be reduced at the same time.

If several drawing operations are to be carried out with the illustrated machine, either several drawing dies 11 and feeding devices 7 must be arranged in succession, or the cable drum 8 filled with the welded metal tubing 6 is placed in the position of the supply reel 1. In this case, the set of shaping rollers 3 and the welding device 5 are not operated.

Figure 2:
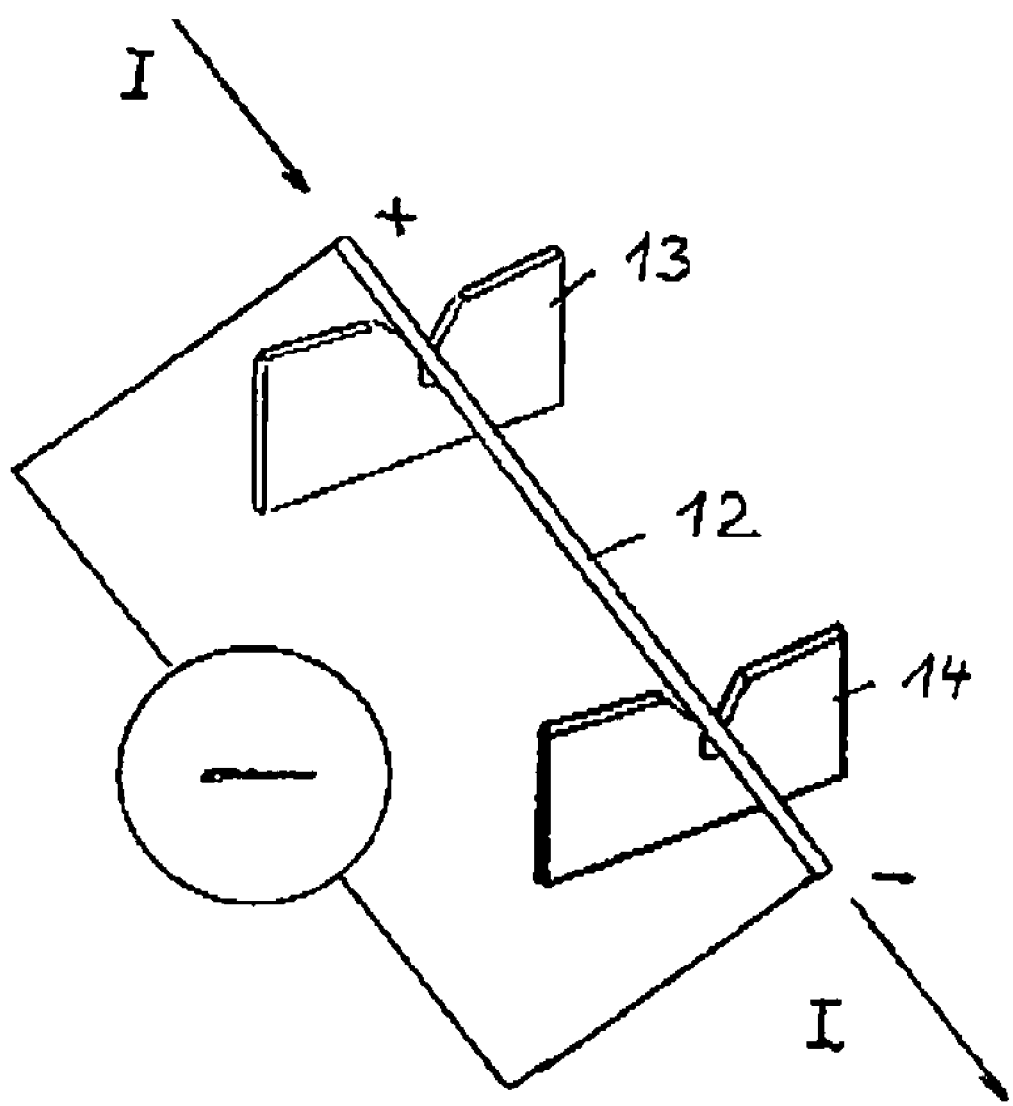
FIG. 2 is a perspective view of the device for measuring the thickness of a metal tube according to one embodiment of the present invention.

The invention will be explained in greater detail with reference to FIG. 2.

To determine the wall thickness of the metal tube, a length of tube 12 is prepared and clamped into the clamping devices 13 and 14. The clamping devices 13 and 14 are made of an electrically conductive material, e.g., steel, and have a design similar to that of a cutting contact. The clamping devices 13 and 14 are mounted a well-defined distance apart on a foundation that is not specified in detail but consists of an electrically insulating material. The length of the tube 12 is greater than the distance that separates the clamping devices 13 and 14. The ends of the metal tube 12 are connected to a power source, so that a current flows through the metal tube 12. The voltage drop along the metal tube 12 is picked up and measured at the clamping devices 13 and 14. In this regard, the contact resistance between the metal tube 12 and the clamping devices 13 and 14 is not measured as a measuring error.

The wall thickness can be determined from the outside diameter of the metal tube 12, which can be accurately measured, and the measured voltage drop, together with the intensity of the measuring current, the voltage, and the material properties of the tube.

$$S = \frac{D}{2} - \sqrt{\frac{D^2}{4} - \frac{\rho l I}{U\pi}}$$

The wall thickness can be directly calculated from the formula. The symbols in the formula have the following meanings:

S=wall thickness
D=outside diameter of the measured tube
ρ=specific resistance of the tube material
l=distance between clamping devices 13 and 14
I=current intensity
U=measured voltage drop The accuracy of the measuring method can be further increased if a reference tube is first reduced only in its outside diameter without a mandrel. The resistance of this reference tube is determined. The resistance value of a metal tube that was drawn with a mandrel, i.e., whose outside diameter and wall thickness were reduced, then varies inversely as the wall thickness of the reference tube, so that the wall thickness can be determined quickly and with great accuracy.

The invention claimed is:

1. Method for determining the wall thickness of a metal tube in a process for the continuous production of longitudinally welded metal tubes, said method comprising the steps of:

welding a longitudinal seam in said metal tube, in which both the outside diameter and the wall thickness are reduced in the same operation;

preparing a reference tube whose outside diameter is the same as said metal tube but whose wall thickness corresponds to the wall thickness of said metal tube before the reduction;

determining the resistance of said reference tube by:
(a) arranging two clamp contacts on said reference tube with an exactly defined distance of separation;
(b) connecting the ends of said reference tube with a power source;
(c) measuring the voltage drop in said reference tube between said two clamp contacts; and
(d) calculating said resistance of said reference tube using said voltage drop;

determining the resistance of said metal tube by:
(a) arranging two clamp contacts on said metal tube with an exactly defined distance of separation;
(b) connecting the ends of said metal tube with a power source;
(c) measuring the voltage drop in the metal tube between said two clamp contacts; and
(d) calculating said resistance of said reference tube using said voltage drop; and calculating the wall thickness of said metal tube using a comparison of the measured resistances of said metal tube and said reference tube.

2. Method in accordance with claim 1, wherein the power source is connected beyond the clamp contacts.

3. Method in accordance with claim 1, wherein the clamp contacts are mounted on an electrically insulating foundation.

4. Method in accordance with claim 1, wherein the wall thickness of the metal tube is calculated by the following formula:

$$S = \frac{D}{2} - \sqrt{\frac{D^2}{4} - \frac{\rho l I}{U\pi}},$$

where S=wall thickness, D equals outside diameter of the measured tube, ρ equals specific resistance of the tube material, l equals distance between clamping devices (13 and 14), I equals current intensity, and U equals measured voltage drop.

* * * * *